(12) United States Patent
Wang

(10) Patent No.: US 10,524,178 B2
(45) Date of Patent: Dec. 31, 2019

(54) SRVCC CAPABILITY INFORMATION TRANSMISSION METHOD AND APPARATUS, AND SYSTEM

(71) Applicant: Huawei Technologies Co., Ltd., Shenzhen (CN)

(72) Inventor: Zhendong Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 106 days.

(21) Appl. No.: 15/857,068

(22) Filed: Dec. 28, 2017

(65) Prior Publication Data

US 2018/0124667 A1    May 3, 2018

Related U.S. Application Data

(63) Continuation of application No. PCT/CN2015/083002, filed on Jun. 30, 2015.

(51) Int. Cl.
*H04W 36/14* (2009.01)
*H04W 8/24* (2009.01)

(52) U.S. Cl.
CPC ............. *H04W 36/14* (2013.01); *H04W 8/24* (2013.01)

(58) Field of Classification Search
CPC ........ H04W 36/14; H04W 36/12; H04W 8/24
See application file for complete search history.

(56) References Cited

U.S. PATENT DOCUMENTS

| | | | |
|---|---|---|---|
| 9,813,950 B2* | 11/2017 | Liu | H04W 36/0022 |
| 2011/0249652 A1 | 10/2011 | Keller et al. | |
| 2013/0208659 A1 | 8/2013 | Nishida | |
| 2015/0373590 A1* | 12/2015 | Ramle | H04W 36/0022 370/331 |

(Continued)

FOREIGN PATENT DOCUMENTS

| | | |
|---|---|---|
| CN | 102273264 A | 12/2011 |
| CN | 102647693 A | 8/2012 |

(Continued)

OTHER PUBLICATIONS

Huawei, "Discussion on transmitting the SRVCC Operation possible IE by S1," 3GPP TSG-RAN3 Meeting #87 R3-150070, Athens, Greece, Feb. 9-13, 2015, 2 pages.
Qualcomm Inc. et al., "Update of SRVCC capability," SA WG2 Meeting #108 S2-150894 (was 52-15xxxx), San Jose Del Cabo, Mexico, Apr. 13-17, 2015, 4 pages.
Alcatel-Lucent, "Choice of S1AP message for updating the SRVCC Operation Possible," 3GPP TSG-RAN WG3 Meeting #88 R3-151015, Fukuoka,Japan, May 25-29, 2015, 2 pages.

(Continued)

*Primary Examiner* — Min Jung
(74) *Attorney, Agent, or Firm* — Slater Matsil, LLP

(57) ABSTRACT

Embodiments of the present invention relate to the field of communications technologies, and disclose a single radio voice call continuity (SRVCC) capability information transmission method and apparatus, and a system. The method in the embodiments of the present invention includes: obtaining, by a core network (CN) network element, SRVCC capability information of a terminal from the terminal, where the terminal accesses, from a first-standard network by means of an inter-RAT handover, a second-standard network in which the CN network element is located, the first-standard network does not support an SRVCC function, and the second-standard network supports the SRVCC function; and sending, by the CN network element, the SRVCC capability information to a radio access network (RAN) network element.

22 Claims, 5 Drawing Sheets

(56) References Cited

U.S. PATENT DOCUMENTS

| | | | | |
|---|---|---|---|---|
| 2016/0262058 A1* | 9/2016 | Jeong | ................... | H04W 4/025 |
| 2016/0330655 A1* | 11/2016 | Vashi | ................ | H04W 36/0022 |
| 2016/0330666 A1* | 11/2016 | Keller | ................... | H04W 48/18 |
| 2016/0345210 A1* | 11/2016 | Shan | ................ | H04W 36/0022 |
| 2017/0064585 A1* | 3/2017 | Kim | ....................... | H04W 36/00 |
| 2018/0103367 A1* | 4/2018 | Kim | ........................ | H04W 8/08 |

FOREIGN PATENT DOCUMENTS

| | | |
|---|---|---|
| CN | 103069880 A | 4/2013 |
| CN | 103249019 A | 8/2013 |
| WO | 2013050061 A1 | 4/2013 |

OTHER PUBLICATIONS

3rd Generation Partnership Project;Technical Specification Group Services and System Aspects; 3GPP System Architecture Evolution (SAE); Security architecture (Release 12), 3GPP TS 33.401 V12.14.0 (Mar. 2015),131 pages.

3rd Generation Partnership Project;Technical Specification Group Radio Access Network;Evolved Universal Terrestrial Radio Access Network(E-UTRAN); S1 Application Protocol (S1AP) (Release 12), 3GPP TS 36.413 V12.5.0 (Mar. 2015) 301 pages.

Huawei, "Correction on the SRVCC Operation possible IE," 3GPP TSG-RAN3 Meeting #87, R3-150071, Athens, Greece, Feb. 9-13, 2015, 7 pages.

\* cited by examiner

SRVCC CAPABILITY INFORMATION TRANSMISSION METHOD AND APPARATUS, AND SYSTEM

CROSS-REFERENCE TO RELATED APPLICATIONS

This application is a continuation of International Application No. PCT/CN2015/083002, filed on Jun. 30, 2015, the disclosure of which is hereby incorporated by reference in its entirety.

TECHNICAL FIELD

The present invention relates to the field of communications technologies, and in particular, to an SRVCC capability information transmission method and apparatus, and a system.

BACKGROUND

Development of communications technologies has brought continuous evolution of network standards. After a new network standard is introduced, establishment of a network of this standard cannot be completed overnight, but needs to go through a gradual process from a hotspot area to a wide coverage. In addition, because a network standard of a commercial network can still serve a terminal, there is usually a voice call continuity problem when the terminal is handed over from a high-standard network to a low-standard network during a call.

Therefore, an SRVCC (Single Radio Voice Call Continuity) solution is introduced. In this solution, a terminal needs to have a capability of converting a high-standard data packet to a low-standard data packet. This may be referred to as an SRVCC capability of the terminal herein. Likewise, a high-standard CN (Core Network) network element needs to have a capability of interacting with a low-standard CN network element, to ensure call continuity. In addition, the CN network element needs to know the SRVCC capability of the terminal, and notifies a RAN (Radio Access Network) network element of the capability, so that the RAN network element starts an SRVCC procedure according to the capability. Therefore, the SRVCC solution involves SRVCC capability negotiation. The SRVCC capability negotiation includes SRVCC capability negotiation between the CN network element and the terminal, and SRVCC capability negotiation between the CN network element and the RAN network element. The SRVCC capability negotiation between the CN network element and the terminal involves a process in which the CN network element obtains the SRVCC-supporting capability of the terminal. The SRVCC capability negotiation process between the CN network element and the RN network element involves a process in which the CN network element notifies the RAN network element of SRVCC capabilities of the terminal and the CN network element.

Currently, an SRVCC process in which a terminal is handed over from an LTE (Long Term Evolution) network already deployed in a network to a 2G or 3G network is used as an example. The terminal may report capability information about whether the terminal supports SRVCC to a CN network element (MME, mobility management entity) in an attach or TAU (Tracking Area Update) procedure by using an attach request or a TAU request. The CN network element may notify, in a handover or initial context setup procedure by using an INITIAL CONTEXT SETUP REQUEST (initial context setup request) message and a HANDOVER REQUEST (handover request) message, a RAN network element (eNB, evolved NodeB) of whether the terminal has an SRVCC capability. However, when the terminal is handed over to a high-standard network by means of an inter-RAT handover, that is, handed over from a low-standard network (for example, a 2G or 3G network) to the high-standard network (for example, an LTE network), because the low-standard network does not need SRVCC capability information, the SRVCC capability information is lacking when the terminal is handed over to the high-standard network. Consequently, after the terminal is handed over to the high-standard network, the RAN network element cannot obtain the SRVCC capability information of the terminal, and cannot start an SRVCC procedure. As a result, voice call continuity cannot be ensured, and voice experience of a user is degraded.

SUMMARY

Embodiments of the present invention provide an SRVCC capability information transmission method and apparatus, and a system, so as to resolve a voice call continuity problem caused after a terminal is handed over to a high-standard network by means of an inter-RAT handover.

To achieve the foregoing objective, the following technical solutions are used in the embodiments of the present invention.

According to a first aspect, an embodiment of the present invention provides an SRVCC capability information transmission method. The method includes obtaining, by a core network (CN) network element, SRVCC capability information of a terminal from the terminal, where the terminal accesses, from a first-standard network by means of an inter-RAT handover, a second-standard network in which the CN network element is located, the first-standard network does not support an SRVCC function, and the second-standard network supports the SRVCC function. The method also includes sending, by the CN network element, the SRVCC capability information to a radio access network (RAN) network element.

With reference to the first aspect, in a first possible implementation of the first aspect, the sending, by the CN network element, the SRVCC capability information to a RAN network element includes: sending, by the CN network element, a user equipment context modification request message to the RAN network element, where the user equipment context modification request message carries the SRVCC capability information.

With reference to first aspect, or the first possible implementation of the first aspect, in a second possible implementation of the first aspect, the obtaining, by a CN network element, SRVCC capability information of a terminal from the terminal includes: obtaining, by the CN network element, the SRVCC capability information of the terminal from a TAU request message in a tracking area update (TAU) procedure.

With reference to any one of the first aspect, or the first or the second possible implementation of the first aspect, in a third possible implementation of the first aspect, the SRVCC capability information of the terminal includes an SRVCC operation possible information element.

According to a second aspect, an embodiment of the present invention provides an SRVCC capability information transmission method. The method includes receiving, by a radio access network (RAN) network element, SRVCC capability information of a terminal sent by a core network (CN) network element, where the terminal accesses, from a first-standard network by means of an inter-RAT handover, a second-standard network in which the RAN network element is located, the first-standard network does not support an SRVCC function, and the second-standard network supports the SRVCC function. The method also includes sending, by the RAN network element, a response message to the CN network element.

With reference to the second aspect, in a first possible implementation of the second aspect, the receiving, by a RAN network element, SRVCC capability information of a terminal sent by a CN network element includes: receiving, by the RAN network element, a user equipment context modification request message sent by the CN network element, where the user equipment context modification request message carries the SRVCC capability information.

With reference to the second aspect, or the first possible implementation of the second aspect, in a second possible implementation of the second aspect, the SRVCC capability information of the terminal includes an SRVCC operation possible information element.

With reference to any one of the second aspect, or the first or the second possible implementation of the second aspect, in a third possible implementation of the second aspect, the method further includes: when a voice service of the terminal needs to be switched to a third-standard network, initiating, by the RAN network element, an SRVCC procedure according to the SRVCC capability information of the terminal.

With reference to the third possible implementation of the second aspect, in a fourth possible implementation of the second aspect, the third-standard network does not support the SRVCC function.

With reference to the third or the fourth possible implementation of the second aspect, in a fifth possible implementation of the second aspect, the third-standard network is the same as or different from the first-standard network.

According to a third aspect, an embodiment of the present invention provides an SRVCC capability information transmission method. The method includes accessing, by a terminal, a second-standard network from a first-standard network by means of an inter-RAT handover, where the first-standard network does not support an SRVCC function, and the second-standard network supports the SRVCC function. The method also includes sending, by the terminal, SRVCC capability information of the terminal to a core network (CN) network element in the second-standard network, so that the CN network element sends the SRVCC capability information of the terminal to a radio access network (RAN) network element in the second-standard network according to an SRVCC capability of the CN network element.

With reference to the third aspect, in a first possible implementation of the third aspect, the terminal sends the SRVCC capability information of the terminal to the CN network element in a tracking area update (TAU) procedure by using a TAU request message.

According to a fourth aspect, an embodiment of the present invention provides an SRVCC capability information transmission apparatus, located in a core network (CN) network element. The apparatus includes an obtaining module, configured to obtain, SRVCC capability information of a terminal from the terminal, where the terminal accesses, from a first-standard network by means of an inter-RAT handover, a second-standard network in which the CN network element is located, the first-standard network does not support an SRVCC function, and the second-standard network supports the SRVCC function. The apparatus also includes a sending module, configured to send the SRVCC capability information to a radio access network (RAN) network element.

With reference to the fourth aspect, in a first possible implementation of the fourth aspect, the sending module is specifically configured to: send a user equipment context modification request message to the RAN network element, where the user equipment context modification request message carries the SRVCC capability information.

With reference to the fourth aspect or the first possible implementation of the fourth aspect, in a second possible implementation of the fourth aspect, the obtaining module is specifically configured to: obtain the SRVCC capability information of the terminal from a TAU request message in a tracking area update (TAU) procedure.

With reference to the apparatus in the fourth aspect, or the first or the second possible implementation of the fourth aspect, in a third possible implementation of the fourth aspect, the SRVCC capability information of the terminal includes an SRVCC operation possible information element.

According to a fifth aspect, an embodiment of the present invention provides an SRVCC capability information transmission apparatus, located in a radio access network (RAN) network element. The apparatus includes a receiving module, configured to receive SRVCC capability information of a terminal sent by a core network (CN) network element, where the terminal accesses, from a first-standard network by means of an inter-RAT handover, a second-standard network in which the RAN network element is located, the first-standard network does not support an SRVCC function, and the second-standard network supports the SRVCC function. The apparatus also includes a sending module, configured to send a response message to the CN network element.

With reference to the fifth aspect, in a first possible implementation of the fifth aspect, the receiving module is specifically configured to: receive a user equipment context modification request message sent by the CN network element, where the user equipment context modification request message carries the SRVCC capability information.

With reference to the fifth aspect, or the first possible implementation of the fifth aspect, in a second possible implementation of the fifth aspect, the SRVCC capability information of the terminal includes an SRVCC operation possible information element.

With reference to the apparatus in the fifth aspect, or the first or the second possible implementation of the fifth aspect, in a third possible implementation of the fifth aspect, the apparatus further includes: a processing module, configured to: when a voice service of the terminal needs to be switched to a third-standard network, initiate an SRVCC procedure according to the SRVCC capability information of the terminal.

With reference to the third possible implementation of the fifth aspect, in a fourth possible implementation of the fifth aspect, the third-standard network does not support the SRVCC function.

With reference to the third or the fourth possible implementation of the fifth aspect, in a fifth possible implementation of the fifth aspect, the third-standard network is the same as or different from the first-standard network.

According to a sixth aspect, an embodiment of the present invention provides an SRVCC capability information transmission apparatus, located in a terminal. The apparatus also includes an access module, configured to access a second-standard network from a first-standard network by means of an inter-RAT handover, where the first-standard network does not support an SRVCC function, and the second-standard network supports the SRVCC function. The apparatus also includes a sending module, configured to send SRVCC capability information of the terminal to a core network (CN) network element in the second-standard network, so that the CN network element sends the SRVCC capability information of the terminal to a radio access network (RAN) network element in the second-standard network according to an SRVCC capability of the CN network element.

With reference to the sixth aspect, in a first possible implementation of the sixth aspect, the sending module is specifically configured to: send the SRVCC capability information of the terminal to the CN network element in a tracking area update (TAU) procedure by using a TAU request message.

According to the SRVCC capability information transmission method and apparatus, and a system, when a terminal accesses a second-standard network from a first-standard network by means of an inter-RAT handover, the terminal sends SRVCC capability information of the terminal to a core network (CN) network element in the second-standard network; the CN network element obtains the SRVCC capability information of the terminal from the terminal, and sends the SRVCC capability information to a radio access network (RAN) network element; and the RAN network element receives the SRVCC capability information of the terminal sent by the CN network element, and sends a response message to the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In the embodiments of the present invention, when a terminal is handed over from a low-standard network to a high-standard network, the terminal may send SRVCC capability information of the terminal to a CN network element in a second-standard network, and then the CN network element sends the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of describing specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

Figure 1:
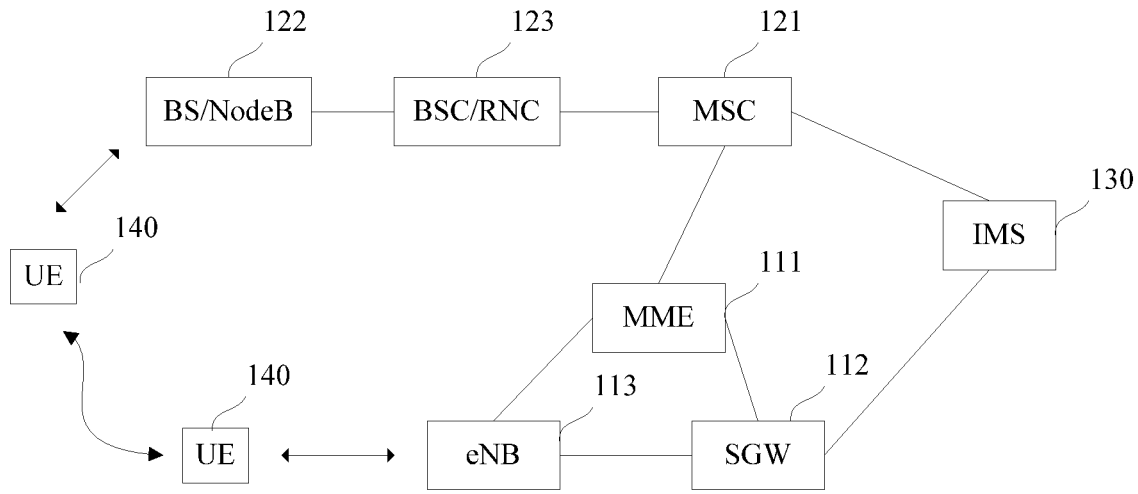
FIG. 1 is a schematic structural diagram of an inter-RAT network according to an embodiment of the present invention.

Referring to FIG. 1, FIG. 1 is a schematic structural diagram of an inter-RAT network according to an embodiment of the present invention. The inter-RAT network includes a high-standard network and a low-standard network (for example, a 2G or 3G network). As shown in FIG. 1, the high-standard network is, for example, an LTE network. The high-standard network includes CN network elements: an MME in and an S-GW (Serving GateWay) 112, and a RAN network element: an eNB 113. The low-standard network is, for example, a 2G or 3G network. The low-standard network includes a CN network element: an MSC (Mobile Switching Center) 121, and a RAN network element. In the 2G network, the RAN network element includes a BS (Base Station) 122 and a BSC (Base Station Controller) 123. In the 3G network, the RAN network element includes a NodeB 122 and an RNC (Radio Network Controller) 123. The system further includes an IMS (IP multimedia subsystem) 130. The IMS 130 can support packet-switched and circuit-switched, so as to provide support for SRVCC implementation.

A terminal 140 (or referred to as user equipment UE) may be handed over between the 2G or 3G network and the LTE network. When the terminal 140 is handed over from the LTE network to the 2G or 3G network, the eNB 113 starts an SRVCC procedure according to SRVCC-supporting capabilities of the terminal 140 and the MME 111, so as to ensure voice service continuity. When the MME in has an SRVCC capability, the MME 111 may notify the eNB 113 of SRVCC capability information of the terminal 140 in a handover or initial context setup procedure by using an INITIAL CONTEXT SETUP REQUEST (initial context setup request) message and a HANDOVER REQUEST (handover request) message. The SRVCC capability information of the terminal 140 is sent by the terminal to the MME 111 by using an attach request or a TAU request in an attach or TAU (Tracking Area Update) procedure.

In the foregoing process, a problem that the eNB 113 cannot learn the SRVCC capability information when the terminal 140 is handed over from the 2G or 3G network to the LTE network by means of an inter-RAT handover is not considered. This is because the 2G network and the 3G network do not need to support an SRVCC function. Therefore, in the handover process, the SRVCC capability information is lacking. When the terminal 140 is handed over to the LTE network, the MME 111 cannot send the SRVCC capability information of the terminal 140 to the eNB 113 in the handover or initial context setup procedure. Consequently, the eNB 113 cannot start the SRVCC procedure, and subsequent voice service continuity cannot be ensured.

In consideration of this problem, in the present invention, after a terminal is handed over to a high-standard network, a CN network element in the high-standard network may send, after obtaining SRVCC capability information of the terminal, the SRVCC capability information to a RAN network element without depending on a handover or initial context setup procedure, so as to ensure that the RAN network element obtains the SRVCC capability information of the terminal, thereby ensuring subsequent voice service continuity. Preferably, the SRVCC capability information of the terminal is sent to the RAN network element by using a user equipment context modification request message in an existing user equipment context modification procedure.

Figure 2:
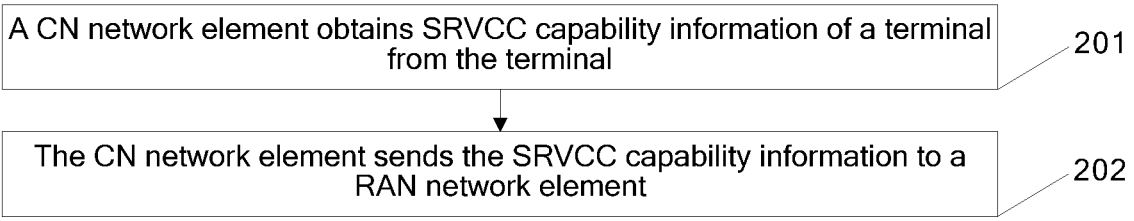
FIG. 2 is a flowchart of an SRVCC capability information transmission method according to an embodiment of the present invention.

An embodiment of the present invention provides an SRVCC capability information transmission method. A procedure of the method is performed by a CN network element. As shown in FIG. 2, the method includes the following steps.

201. The CN network element obtains SRVCC capability information of a terminal from the terminal.

The terminal accesses, from a first-standard network by means of an inter-RAT handover, a second-standard network in which the CN network element is located. The first-standard network does not support an SRVCC function, and the second-standard network supports the SRVCC function.

202. The CN network element sends the SRVCC capability information to a RAN network element.

After the terminal is handed over from a low-standard network to a high-standard network by means of an inter-RAT handover, the terminal may report the SRVCC capability information of the terminal to the CN network element in a TAU procedure. For example, the terminal adds the SRVCC capability information to a TAU request (TAU request), so as to send the SRVCC capability information to the CN network element. In this way, the CN network element can obtain the SRVCC capability information of the terminal after the terminal accesses the network in which the network element is located. Then, after the CN network element has an SRVCC capability, the CN network element may send the SRVCC capability information of the terminal to the RAN network element, so that the RAN network element starts an SRVCC procedure according to the SRVCC capability information when the terminal needs to be handed over from the high-standard network to the low-standard network.

The CN network element may send the SRVCC capability information to the RAN network element by using newly added signaling, or may add the SRVCC capability information to an existing signaling procedure, for example, add the SRVCC capability information to a user equipment context modification request message. As shown in Table 1, the SRVCC capability information is newly added to the user equipment context modification request message. The SRVCC capability information is, for example, an SRVCC operation possible information element.

TABLE 1

| Information element name (IE/Group Name) | Whether it is optional (Presence) | Chapter defined in the TS36.413 protocol (IE type and reference) | Assigned criticality (Assigned Criticality) |
|---|---|---|---|
| Message type (Message Type) | Mandatory (Mandatory) | 9.2.1.1 | Reject (reject) |
| Mobility management entity terminal S1 interface application protocol ID (MME UE S1AP ID) | Mandatory (Mandatory) | 9.2.3.3 | Reject (reject) |
| Evolved NodeB terminal S1 interface application protocol ID (eNB UE S1AP ID) | Mandatory (Mandatory) | 9.2.3.4 | Reject (reject) |
| Security key (Security Key) | Optional (Optional) | 9.2.1.41 | Reject (reject) |
| Subscriber profile ID for radio access type/Frequency priority (Subscriber Profile ID for RAT/Frequency priority) | Optional (Optional) | 9.2.1.39 | Ignore (ignore) |
| Terminal aggregate maximum bit rate (UE Aggregate Maximum Bit Rate) | Optional (Optional) | 9.2.1.20 | Ignore (ignore) |
| Circuit switched fallback indicator (CS Fallback Indicator) | Optional (Optional) | 9.2.3.21 | Reject (reject) |
| Terminal security capabilities (UE Security Capabilities) | Optional (Optional) | 9.2.1.40 | Reject (reject) |
| Closed subscriber group membership status (CSG Membership Status) | Optional (Optional) | 9.2.1.73 | Ignore (ignore) |
| Registered location area identity (Location Area Identity) (Registered LAI) | Optional (Optional) | 9.2.3.1 | Ignore (ignore) |
| Additional circuit switched fallback indicator (Additional | Comparative (Comparative) - if CSFB | 9.2.3.37 | Ignore (ignore) |

TABLE 1-continued

| Information element name (IE/Group Name) | Whether it is optional (Presence) | Chapter defined in the TS36.413 protocol (IE type and reference) | Assigned criticality (Assigned Criticality) |
|---|---|---|---|
| CS Fallback Indicator | (Circuit Switched Fallback, circuit switched fallback) high priority (if CSFB high priority) | | |
| SRVCC operation possible (SRVCC Operation Possible) | Optional (Optional) | 9.2.1.58 | Ignore (ignore) |

In this embodiment of the present invention, the newly added SRVCC operation possible information element may be used as an optional information element, and sent by the CN network element to the RAN network element. When receiving the user equipment context modification request message sent by the CN network element, the RAN network element may store the SRVCC operation possible information element for use by the terminal in a subsequent inter-RAT handover.

It should be noted that the SRVCC operation possible information element is specifically defined in 9.2.1.58 in the TS36.413 protocol, and is not described in detail in this specification.

According to the SRVCC capability information transmission method provided in this embodiment, a CN network element obtains SRVCC capability information of a terminal from the terminal, and sends the SRVCC capability information to a RAN network element, so that the RAN network element receives the SRVCC capability information of the terminal sent by the CN network element. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a CN network element may obtain SRVCC capability information of the terminal and send the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 3:
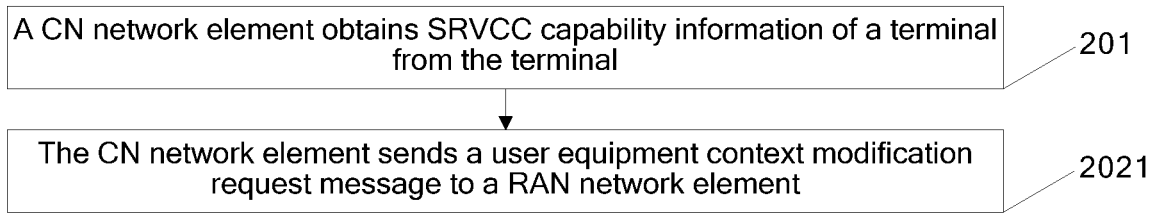
FIG. 3 is a flowchart of another SRVCC capability information transmission method according to an embodiment of the present invention.

In an implementation of this embodiment of the present invention, the CN network element may send the SRVCC capability information to the RAN network element by sending a user equipment context modification request message to the RAN network element. Therefore, based on the implementation shown in FIG. 2, step 202 in which the CN network element sends the SRVCC capability information to the RAN network element may be specifically implemented as step 2021. A specific implementation is shown in FIG. 3.

2021. The CN network element sends a user equipment context modification request message to the RAN network element.

The user equipment context modification request message carries the SRVCC capability information.

According to the SRVCC capability information transmission method provided in this embodiment, a CN network element obtains SRVCC capability information of a terminal from the terminal, and sends the SRVCC capability information to a RAN network element, so that the RAN network element receives the SRVCC capability information of the terminal sent by the CN network element. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a CN network element may obtain SRVCC capability information of the terminal and send the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 4:
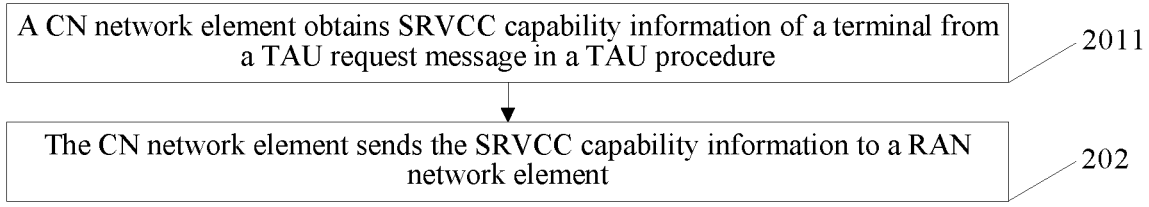
FIG. 4 is a flowchart of another SRVCC capability information transmission method according to an embodiment of the present invention.

In an implementation of this embodiment of the present invention, the CN network element may obtain the SRVCC capability information of the terminal from a TAU request message. Therefore, based on the implementation shown in FIG. 2, step 201 in which the CN network element obtains the SRVCC capability information of the terminal from the terminal may be specifically implemented as step 2011. A specific implementation is shown in FIG. 4.

2011. The CN network element obtains the SRVCC capability information of the terminal from a TAU request message in a TAU procedure.

According to the SRVCC capability information transmission method provided in this embodiment, a CN network element obtains SRVCC capability information of a terminal from a TAU request message in a TAU procedure, and sends the SRVCC capability information to a RAN network element, so that the RAN network element receives the SRVCC capability information of the terminal sent by the CN network element. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a CN network element may obtain SRVCC capability information of the terminal from a TAU request message in a TAU procedure and send the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 5:
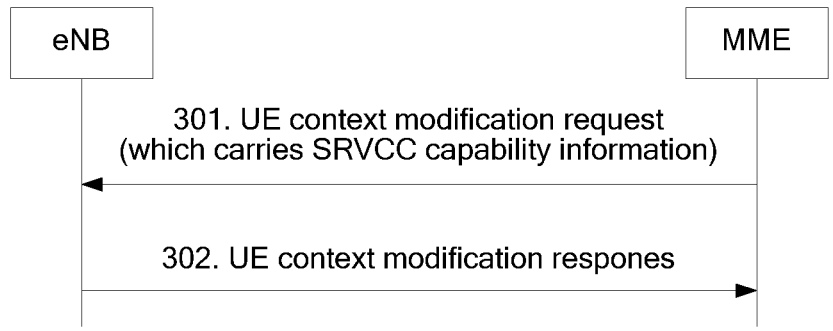
FIG. 5 is an interworking flowchart of SRVCC capability information transmission in a specific application scenario according to an embodiment of the present invention.

An embodiment of the present invention provides an SRVCC capability information transmission method. A CN network element sends SRVCC capability information of a terminal to a RAN network element in a UE context modification procedure, so that no new signaling procedure needs to be added. As shown in FIG. 5, FIG. 5 is an interworking flowchart of SRVCC capability information transmission in a specific application scenario. In this embodiment, an LTE network is used as an example. The CN network element is an MME, and the RAN network element is an eNB. As shown in FIG. 5, the method includes the following steps.

301. The CN network element sends a user equipment context modification request message to the RAN network element, where the user equipment context modification request message carries the SRVCC capability information of the terminal.

302. The RAN network element receives the user equipment context modification request message, and sends a user equipment context modification response to the CN network element.

In this way, after the terminal is handed over to a high-standard network, a CN network element in the high-standard network may send, after obtaining the SRVCC capability information of the terminal, the SRVCC capability information to the RAN network element by using a user equipment context modification request message, and then the RAN network element returns a user equipment context modification response message to the CN network element.

According to the SRVCC capability information transmission method provided in this embodiment of the present invention, a CN network element obtains SRVCC capability information of a terminal from the terminal, and sends, to a RAN network element, a user equipment context modification request message that carries the SRVCC capability information, so that the RAN network element receives the SRVCC capability information of the terminal sent by the CN network element. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a CN network element may obtain SRVCC capability information of the terminal, and send the SRVCC capability information to a RAN network element by sending a user equipment context modification request message. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 6:
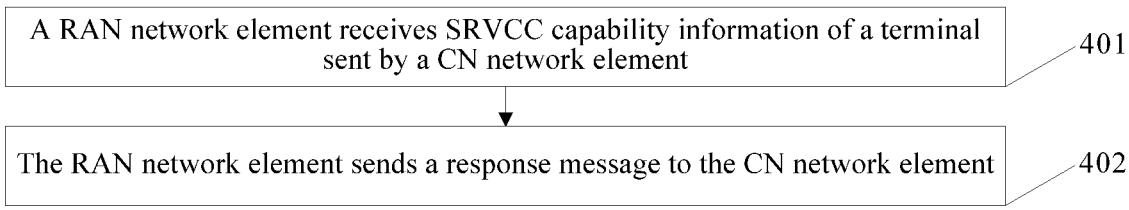
FIG. 6 is a flowchart of another SRVCC capability information transmission method according to an embodiment of the present invention.

An embodiment of the present invention provides an SRVCC capability information transmission method. A procedure of the method is performed by a RAN network element. As shown in FIG. 6, the method includes the following steps.

401. The RAN network element receives SRVCC capability information of a terminal sent by a CN network element.

The terminal accesses, from a first-standard network by means of an inter-RAT handover, a second-standard network in which the RAN network element is located. The first-standard network does not support an SRVCC function, and the second-standard network supports the SRVCC function.

It should be noted that the SRVCC capability information of the terminal includes an SRVCC operation possible information element.

402. The RAN network element sends a response message to the CN network element.

According to the SRVCC capability information transmission method provided in this embodiment, when a terminal accesses a second-standard network from a first-standard network by means of an inter-RAT handover, a RAN network element receives SRVCC capability information of the terminal sent by a CN network element, and sends a response message to the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a RAN network element may receive SRVCC capability information sent by a CN network element, and return a response message to the CN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

In an implementation of this embodiment of the present invention, the RAN network element may obtain the SRVCC capability information by receiving a user equipment context modification request message that carries the SRVCC capability information and that is sent by the CN network element.

Figure 7:
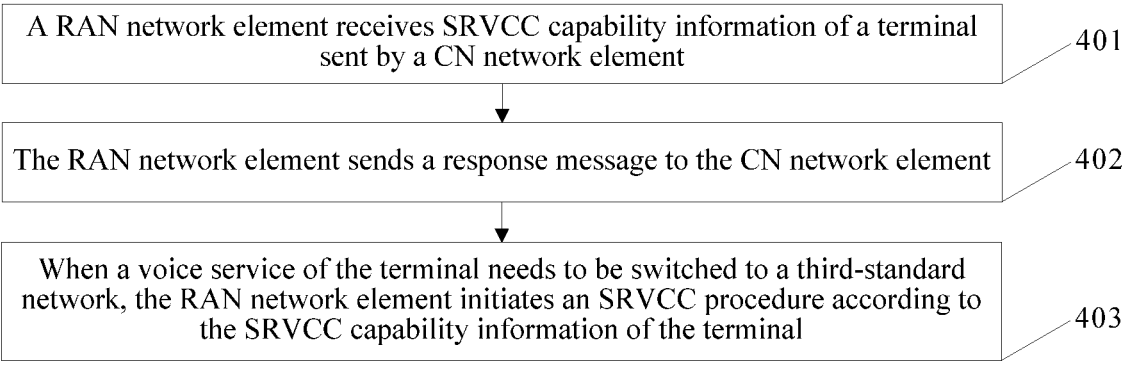
FIG. 7 is a flowchart of another SRVCC capability information transmission method according to an embodiment of the present invention.

In an implementation of this embodiment of the present invention, after the RAN network element returns the response message to the CN network element, if a voice service of the terminal needs to be switched to a third-standard network, the RAN network element may initiate an SRVCC procedure according to the SRVCC capability information of the terminal. Therefore, based on the implementation shown in FIG. 6, an implementation shown in FIG. 7 may further be implemented, that is, after step 402 in which the RAN network element sends the response message to the CN network element is performed, step 403 may be performed.

403. When a voice service of the terminal needs to be switched to a third-standard network, the RAN network element initiates an SRVCC procedure according to the SRVCC capability information of the terminal.

It should be noted that the third-standard network does not support the SRVCC function, and the third-standard network is the same as or different from the first-standard network.

According to the SRVCC capability information transmission method provided in this embodiment of the present invention, when a terminal is handed over from a first-standard network to a second-standard network by means of an inter-RAT handover, a RAN network element receives SRVCC capability information of the terminal sent by a CN network element, and sends a response message to the CN network element. In addition, when a voice service of the terminal needs to be switched to a third-standard network, the RAN network element may initiate an SRVCC procedure according to the SRVCC capability information of the terminal. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a RAN network element may receive SRVCC capability information sent by a CN network element, and return a response message to the CN network element. In addition, when a voice service of the terminal needs to be switched to a third-standard network, the RAN network element may initiate an SRVCC procedure according to the SRVCC capability information of the terminal. Therefore, after the terminal is handed over to the high-standard network, the RAN network element obtains the SRVCC capability information of the terminal, so as to start the SRVCC procedure when the terminal is handed over to the third-standard network, thereby not only resolving a voice call continuity problem caused after the terminal is handed over to the high-standard network by means of an inter-RAT handover, but also resolving a voice call continuity problem caused when the terminal is handed over to the third-standard network again.

Figure 8:
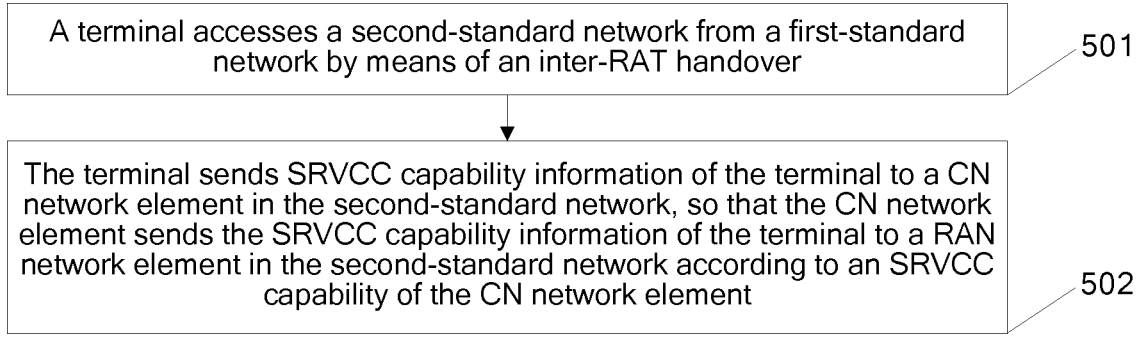
FIG. 8 is a flowchart of another SRVCC capability information transmission method according to an embodiment of the present invention.

An embodiment of the present invention provides an SRVCC capability information transmission method. A procedure of the method is performed by a terminal. As shown in FIG. 8, the method includes the following steps.

501. The terminal accesses a second-standard network from a first-standard network by means of an inter-RAT handover.

The first-standard network does not support an SRVCC function, and the second-standard network supports the SRVCC function.

502. The terminal sends SRVCC capability information of the terminal to a CN network element in the second-standard network, so that the CN network element sends the SRVCC capability information of the terminal to a RAN network element in the second-standard network according to an SRVCC capability of the CN network element.

According to the SRVCC capability information transmission method provided in this embodiment of the present invention, when a terminal accesses a second-standard network from a first-standard network by means of an inter-RAT handover, the terminal sends SRVCC capability information of the terminal to a CN network element in the second-standard network, so that the CN network element sends the SRVCC capability information of the terminal to a RAN network element in the second-standard network according to an SRVCC capability of the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, the terminal may send SRVCC capability information of the terminal to a CN network element in a second-standard network, so that the CN network element sends the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

In an implementation of this embodiment of the present invention, the terminal may send the SRVCC capability information to the CN network element by using a TAU request message.

Figure 9:
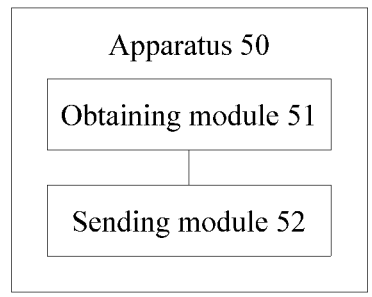
FIG. 9 is a schematic structural diagram of an SRVCC capability information transmission apparatus according to an embodiment of the present invention.

An embodiment of the present invention provides an SRVCC capability information transmission apparatus 50. The apparatus is located in a CN network element. As shown in FIG. 9, the apparatus 50 includes: an obtaining module 51, configured to obtain SRVCC capability information of a terminal from the terminal, where the terminal accesses, from a first-standard network by means of an inter-RAT handover, a second-standard network in which the CN network element is located, the first-standard network does not support an SRVCC function, and the second-standard network supports the SRVCC function; and a sending module 52, configure to send the SRVCC capability information to a RAN network element.

According to the SRVCC capability information transmission apparatus provided in this embodiment of the present invention, a CN network element obtains SRVCC capability information of a terminal from the terminal, and sends the SRVCC capability information to a RAN network element, so that the RAN network element receives the SRVCC capability information of the terminal sent by the CN network element. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a CN network element may obtain SRVCC capability information of the terminal and send the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

In an implementation of this embodiment of the present invention, the sending module 52 is specifically configured to: send a user equipment context modification request message to the RAN network element, where the user equipment context modification request message carries the SRVCC capability information.

In an implementation of this embodiment of the present invention, the obtaining module 51 is specifically configured to: obtain the SRVCC capability information of the terminal from a TAU request message in a TAU procedure.

In an implementation of this embodiment of the present invention, the SRVCC capability information of the terminal includes an SRVCC operation possible information element.

It should be noted that the obtaining module 51 may be a standalone processor, or may be integrated into a processor in the CN network element. Alternatively, program code may be stored in a memory in the CN network element, and a processor in the CN network element invokes the program code and performs a function of the obtaining module 51. The processor described herein may be a CPU, or may be an application-specific integrated circuit (ASIC), or may be one or more integrated circuits configured to implement the embodiments of the present invention. Implementation of the sending module 52 is similar to that of the obtaining module 51, and the sending module 52 may be integrated with the obtaining module 51, or may be implemented independently. The CN network element has an interface for communicating with the RAN network element, and the obtaining module 51 and the sending module 52 communicate with the RAN network element by using the interface. Preferably, the interface is a wired interface such as a fiber interface. Certainly, the interface may be in another interface form, such as a coaxial cable or in a wireless form.

Figure 10:
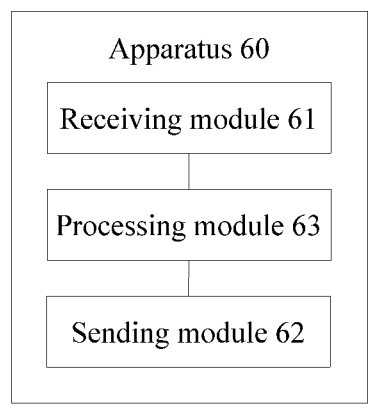
FIG. 10 is a schematic structural diagram of another SRVCC capability information transmission apparatus according to an embodiment of the present invention.

An embodiment of the present invention provides an SRVCC capability information transmission apparatus 60. The apparatus is located in a RAN network element. As shown in FIG. 10, the apparatus 60 includes: a receiving module 61, configured to receive SRVCC capability information of a terminal sent by a CN network element, where the terminal accesses, from a first-standard network by means of an inter-RAT handover, a second-standard network in which the RAN network element is located, the first-standard network does not support an SRVCC function, and the second-standard network supports the SRVCC function; and a sending module 62, configured to send a response message to the CN network element.

According to the SRVCC capability information transmission apparatus provided in this embodiment of the present invention, when a terminal is handed over from a first-standard network to a second-standard network by means of an inter-RAT handover, a RAN network element receives SRVCC capability information of the terminal sent by a CN network element, and sends a response message to the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a RAN network element may receive SRVCC capability information sent by a CN network element, and return a response message to the CN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

In an implementation of this embodiment of the present invention, the receiving module 61 is specifically configured to: receive a user equipment context modification request message sent by the CN network element, where the user equipment context modification request message carries the SRVCC capability information.

In an implementation of this embodiment of the present invention, the SRVCC capability information of the terminal includes an SRVCC operation possible information element.

In an implementation of this embodiment of the present invention, the apparatus 60 further includes: a processing module 63, configured to: when a voice service of the terminal needs to be switched to a third-standard network, initiate an SRVCC procedure according to the SRVCC capability information of the terminal.

In another implementation of this embodiment of the present invention, the third-standard network does not support the SRVCC function.

In another implementation of this embodiment of the present invention, the third-standard network is the same as or different from the first-standard network.

It should be noted that the receiving module 61 may be a standalone processor, or the receiving module 61 may be integrated into a processor in the RAN network element. Alternatively, program code may be stored in a memory in the RAN network element, and a processor in the RAN network element invokes the program code and performs a function of the receiving module 61. The processor described herein may be a CPU, or may be an ASIC, or may be one or more integrated circuits configured to implement the embodiments of the present invention. Implementation of the sending module 62 is similar to that of the receiving module 61, and the sending module 62 may be integrated with the receiving module 61, or may be implemented independently. The RAN network element has an interface for communicating with the CN network element, and the receiving module 61 and the sending module 62 communicate with the CN network element by using the interface. Preferably, the interface is a wired interface such as a fiber interface. Certainly, the interface may be in another interface form, such as a coaxial cable or in a wireless form. In addition, implementation of the processing module 63 is the same as that of the receiving module 61, and the processing module 63 may be integrated with the receiving module 61 or the sending module 62 or both, or may be implemented independently.

Figure 11:
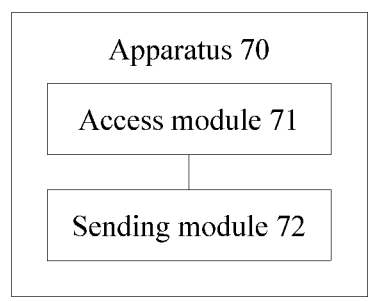
FIG. 11 is a schematic structural diagram of another SRVCC capability information transmission apparatus according to an embodiment of the present invention.

An embodiment of the present invention provides an SRVCC capability information transmission apparatus 70. The apparatus is located in a terminal. As shown in FIG. 11, the apparatus 70 includes: an access module 71, configured to access a second-standard network from a first-standard network by means of an inter-RAT handover, where the first-standard network does not support an SRVCC function, and the second-standard network supports the SRVCC function; and a sending module 72, configured to send SRVCC capability information of the terminal to a CN network element in the second-standard network, so that the CN network element sends the SRVCC capability information of the terminal to a RAN network element in the second-standard network according to an SRVCC capability of the CN network element.

In an implementation of this embodiment of the present invention, the sending module 72 is specifically configured to: send the SRVCC capability information of the terminal to the CN network element in a TAU procedure by using a TAU request message.

According to the SRVCC capability information transmission apparatus provided in this embodiment of the present invention, when a terminal accesses a second-standard network from a first-standard network by means of an inter-RAT handover, the terminal sends SRVCC capability information of the terminal to a CN network element in the second-standard network, so that the CN network element sends the SRVCC capability information of the terminal to a RAN network element in the second-standard network according to an SRVCC capability of the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, the terminal may send SRVCC capability information of the terminal to a CN network element in a second-standard network, so that the CN network element sends the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 12:
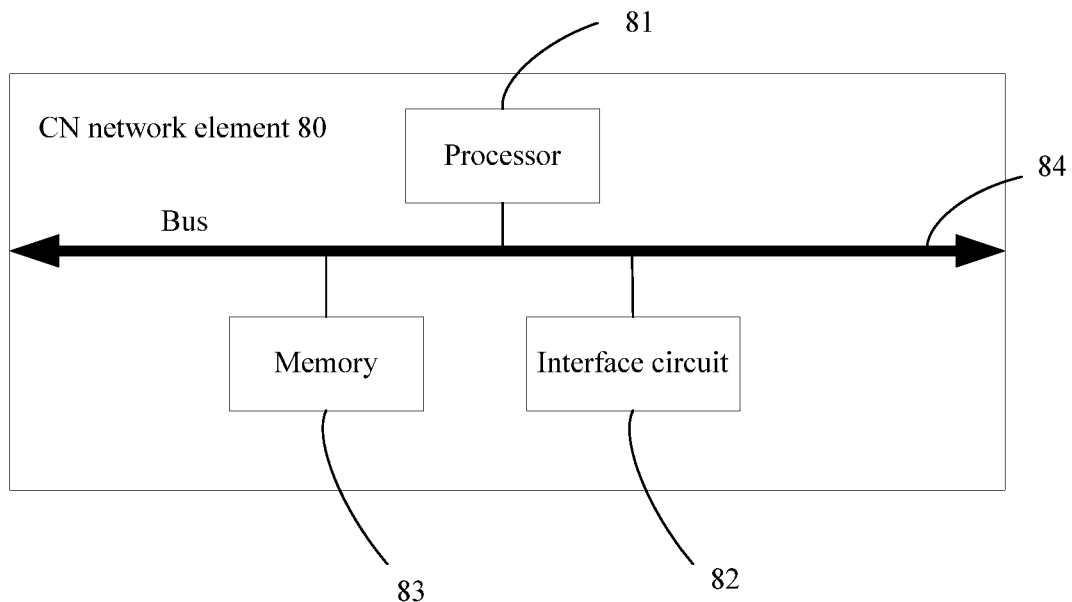
FIG. 12 is a schematic structural diagram of a CN network element according to an embodiment of the present invention.

Further, referring to FIG. 12, FIG. 12 is a schematic structural diagram of a core network (CN) network element 80 according to another embodiment of the present invention. As shown in FIG. 12, the CN network element 80 includes a processor 81 and an interface circuit 82. A memory 83 and a bus 84 are further shown in the figure. The processor 81, the interface circuit 82, and the memory 83 are connected by using the bus 84 and complete communication with each other.

It should be noted that the processor 81 herein may be one processing element, or may be a collective name of multiple processing elements. For example, the processing element may be a central processing unit (CPU) or may be an application-specific integrated circuit (ASIC), or may be one or more integrated circuits configured to implement the embodiments of the present invention, such as one or more microprocessors (digital signal processor, DSP) or one or more field programmable gate arrays (FPGA).

The memory 83 may be one storage apparatus, or may be a collective name of multiple storage elements, and is configured to store executable program code, or parameters, data, and the like required for running of an access network management device. In addition, the memory 83 may include a random access memory (RAM) or may include a non-volatile memory, such as a magnetic disk storage or a flash.

The bus 84 may be an industry standard architecture (ISA) bus, a peripheral component interconnect (PCI) bus, an extended industry standard architecture (EISA) bus, or the like. The bus 84 may be classified into an address bus, a data bus, a control bus, and the like. For ease of representation, only one bold line is used for representation in FIG. 12, but it does not represent that there is only one bus or one type of bus.

The CN network element 80 may further include an input/output apparatus that is connected to the bus 84, so as to be connected to another part such as the processor 81 by using the bus.

The processor 81 invokes the program code in the memory 83 to perform the operations performed by the CN network element in the foregoing method embodiments. For example, the operations include: obtaining SRVCC capability information of a terminal from the terminal by using the interface circuit 82, where the terminal accesses, from a first-standard network by means of an inter-RAT handover, a second-standard network in which the CN network element is located, the first-standard network does not support an SRVCC function, and the second-standard network supports the SRVCC function; and sending the SRVCC capability information to a radio access network (RAN) network element by using the interface circuit 82.

The interface circuit 82 is configured to implement a connection between the CN network element and the RAN network element. The terminal sends the SRVCC capability information of the terminal to the RAN network element. The RAN network element sends the SRVCC capability information of the terminal to the CN network element by using an interface between the RAN network element and the CN network element. In this way, the CN network element can obtain the SRVCC capability information.

In an implementation of this embodiment of the present invention, the processor 81 sends the SRVCC capability information to the RAN network element by using a user equipment context modification request message in a user equipment context modification procedure, and is specifically configured to: send the user equipment context modification request message to the RAN network element, where the user equipment context modification request message carries the SRVCC capability information.

In an implementation of this embodiment of the present invention, the processor 81 obtains the SRVCC capability information of the terminal from a TAU request message in a tracking area update (TAU) procedure.

In an implementation of this embodiment of the present invention, the SRVCC capability information of the terminal includes an SRVCC operation possible information element.

According to the CN network element provided in this embodiment of the present invention, the CN network element obtains SRVCC capability information of a terminal from the terminal, and sends the SRVCC capability information to a RAN network element, so that the RAN network element receives the SRVCC capability information of the terminal sent by the CN network element. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a CN network element may obtain SRVCC capability information of the terminal and send the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 13:
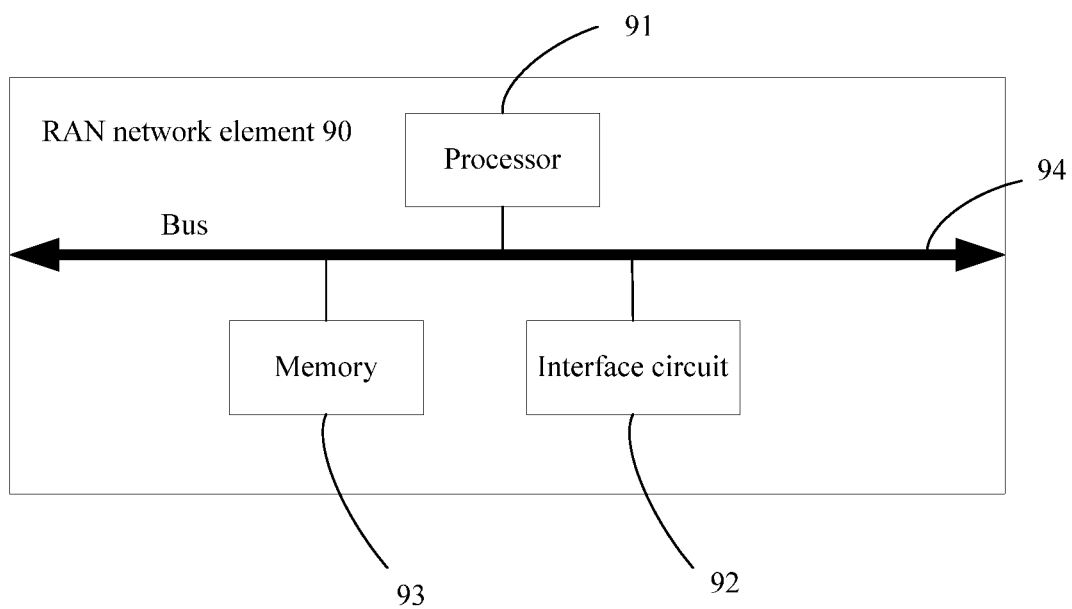
FIG. 13 is a schematic structural diagram of a RAN network element according to an embodiment of the present invention.

Further, referring to FIG. 13, FIG. 13 is a schematic structural diagram of a radio access network (RAN) network element 90 according to another embodiment of the present invention. As shown in FIG. 13, the RAN network element 90 includes a processor 91 and an interface circuit 92. A memory 93 and a bus 94 are further shown in the figure. The processor 91, the interface circuit 92, and the memory 93 are connected by using the bus 94 and complete communication with each other.

It should be noted that the processor 91 herein may be one processing element, or may be a collective name of multiple processing elements. For example, the processing element may be a central processing unit (CPU) or may be an application-specific integrated circuit (ASIC), or may be one or more integrated circuits configured to implement the embodiments of the present invention, such as one or more microprocessors (digital signal processor, DSP) or one or more field programmable gate arrays (FPGA).

The memory 93 may be one storage apparatus, or may be a collective name of multiple storage elements, and is configured to store executable program code, or parameters, data, and the like required for running of an access network management device. In addition, the memory 93 may include a random access memory (RAM) or may include a non-volatile memory, such as a magnetic disk storage or a flash.

The bus 94 may be an industry standard architecture (ISA) bus, a peripheral component interconnect (PCI) bus, an extended industry standard architecture (EISA) bus, or the like. The bus 94 may be classified into an address bus, a data bus, a control bus, and the like. For ease of representation, only one bold line is used for representation in FIG. 13, but it does not represent that there is only one bus or one type of bus.

The RAN network element 90 may further include an input/output apparatus that is connected to the bus 94, so as to be connected to another part such as the processor 91 by using the bus.

The processor 91 invokes the program code in the memory 93 to perform the operations performed by the RAN network element in the foregoing method embodiments. For example, the operations include: receiving SRVCC capability information of a terminal sent by a core network (CN) network element, where the terminal accesses, from a first-standard network by means of an inter-RAT handover, a second-standard network in which the RAN network element is located, the first-standard network does not support an SRVCC function, and the second-standard network supports the SRVCC function; and sending a response message to the CN network element.

Interaction between the processor 91 in the RAN network element and the CN network element is implemented by using the interface circuit 92.

In an implementation of this embodiment of the present invention, the processor 91 is specifically configured to: receive a user equipment context modification request message sent by the CN network element, where the user equipment context modification request message carries the SRVCC capability information.

In an implementation of this embodiment of the present invention, the SRVCC capability information of the terminal includes an SRVCC operation possible information element.

In an implementation of this embodiment of the present invention, the processor 91 is further specifically configured to: when a voice service of the terminal needs to be switched to a third-standard network, initiate an SRVCC procedure according to the SRVCC capability information of the terminal.

In an implementation of this embodiment of the present invention, the third-standard network does not support the SRVCC function.

In an implementation of this embodiment of the present invention, the third-standard network is the same as or different from the first-standard network.

According to the RAN network element provided in this embodiment of the present invention, when a terminal accesses a second-standard network from a first-standard network by means of an inter-RAT handover, the RAN network element receives SRVCC capability information of the terminal sent by a CN network element, and sends a response message to the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, a RAN network element may receive SRVCC capability information sent by a CN network element, and return a response message to the CN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

Figure 14:
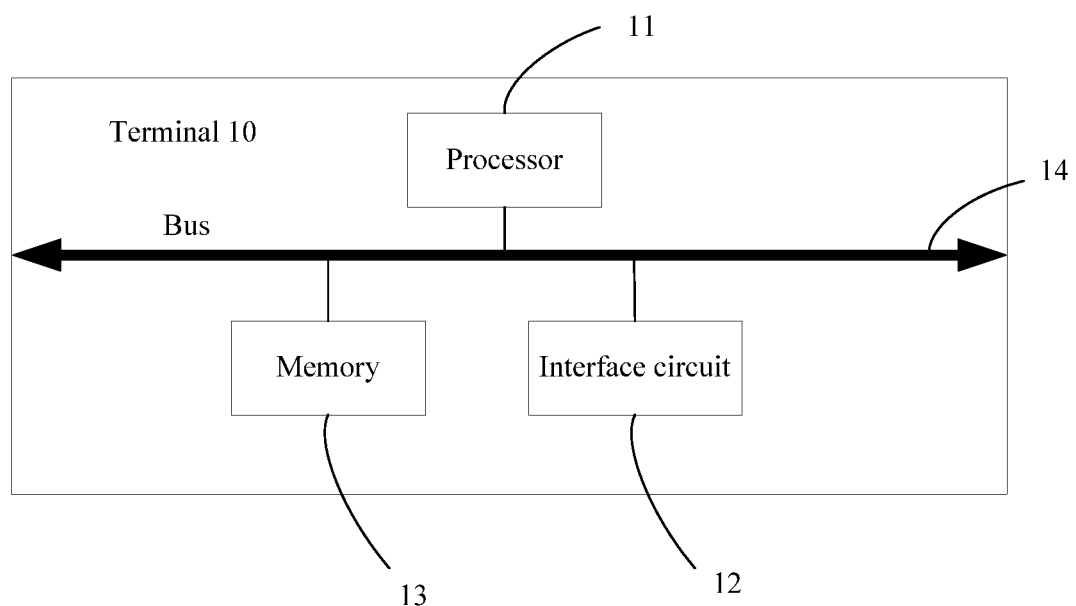
FIG. 14 is a schematic structural diagram of a terminal according to an embodiment of the present invention.

Further, referring to FIG. 14, FIG. 14 is a schematic structural diagram of a terminal 10 according to another embodiment of the present invention. As shown in FIG. 14, the terminal 10 includes a processor 11 and an interface circuit 12. A memory 13 and a bus 14 are further shown in the figure. The processor 11, the interface circuit 12, and the memory 13 are connected by using the bus 14 and complete communication with each other.

It should be noted that the processor 11 herein may be one processing element, or may be a collective name of multiple processing elements. For example, the processing element may be a central processing unit (CPU) or may be an application-specific integrated circuit (ASIC), or may be one or more integrated circuits configured to implement the embodiments of the present invention, such as one or more microprocessors (digital signal processor, DSP) or one or more field programmable gate arrays (FPGA).

The memory 13 may be one storage apparatus, or may be a collective name of multiple storage elements, and is configured to store executable program code, or parameters, data, and the like required for running of an access network management device. In addition, the memory 13 may include a random access memory (RAM) or may include a non-volatile memory, such as a magnetic disk storage or a flash.

The bus 14 may be an industry standard architecture (ISA) bus, a peripheral component interconnect (PCI) bus, an extended industry standard architecture (EISA) bus, or the like. The bus 14 may be classified into an address bus, a data bus, a control bus, and the like. For ease of representation, only one bold line is used for representation in FIG. 14, but it does not represent that there is only one bus or one type of bus.

The terminal 10 may further include an input/output apparatus that is connected to the bus 14, so as to be connected to another part such as the processor 11 by using the bus.

The processor 11 invokes the program code in the memory 13 to perform the operations performed by the terminal in the foregoing method embodiments. For example, the operations include: accessing a second-standard network from a first-standard network by means of an inter-RAT handover, where the first-standard network does not support an SRVCC function, and the second-standard network supports the SRVCC function; and sending SRVCC capability information of the terminal to a core network (CN) network element in the second-standard network, so that the CN network element sends the SRVCC capability information of the terminal to a radio access network (RAN) network element in the second-standard network according to an SRVCC capability of the CN network element.

The interface circuit 12 is configured to implement communication between the terminal and the RAN network element. The processor 11 in the terminal may access the RAN network element in the second-standard network by using the interface circuit, and send the SRVCC capability information of the terminal to the CN network element through the RAN network element.

In an implementation of this embodiment of the present invention, the processor 11 is specifically configured to: send the SRVCC capability information of the terminal to the CN network element in a tracking area update (TAU) procedure by using a TAU request message.

According to the terminal provided in this embodiment of the present invention, when the terminal accesses a second-standard network from a first-standard network by means of an inter-RAT handover, the terminal sends SRVCC capability information of the terminal to a CN network element in the second-standard network, so that the CN network element sends the SRVCC capability information of the terminal to a RAN network element in the second-standard network according to an SRVCC capability of the CN network element. The first-standard network does not support an SRVCC function, and the second-standard network supports the SRVCC function. Compared with the prior art, when a terminal is handed over from a low-standard network to a high-standard network by means of an inter-RAT handover, because the low-standard network does not need SRVCC capability information, the SRVCC capability information is lacking when the terminal is handed over to the high-standard network. In this embodiment of the present invention, when a terminal is handed over from a low-standard network to a high-standard network, the terminal may send SRVCC capability information of the terminal to a CN network element in a second-standard network, so that the CN network element sends the SRVCC capability information of the terminal to a RAN network element. Therefore, after the terminal is handed over to the high-standard network, the RAN network element obtains the SRVCC capability information of the terminal, so as to start an SRVCC procedure, thereby resolving a voice call continuity problem caused after the terminal is handed over to the high-standard network by means of an inter-RAT handover.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining, by a core network (CN) network element from a terminal, single radio voice call continuity (SRVCC) capability information of the terminal, wherein the CN network element is located in a second-standard network to which the terminal is handed over from a first-standard network using an inter-RAT handover, the first-standard network does not support an SRVCC function, and the second-standard network supports the SRVCC function; and
    sending, by the CN network element to a radio access network (RAN) network element, the SRVCC capability information, wherein the RAN network element initiates an SRVCC procedure according to the SRVCC capability information of the terminal when switching a voice service of the terminal to a third-standard network, and wherein the third-standard network does not support the SRVCC function.

2. The method according to claim 1, wherein sending, by the CN network element, the SRVCC capability information to the RAN network element comprises:
    sending, by the CN network element, a user equipment context modification request message to the RAN network element, wherein the user equipment context modification request message carries the SRVCC capability information.

3. The method according to claim 1, wherein obtaining, by the CN network element, SRVCC capability information of the terminal from the terminal comprises:
    obtaining, by the CN network element, the SRVCC capability information of the terminal from a tracking area update (TAU) request message in a TAU procedure.

4. The method according to claim 1, wherein the SRVCC capability information of the terminal comprises an SRVCC operation possible information element.

5. A method, comprising:
    receiving, by a radio access network (RAN) network element, single radio voice call continuity (SRVCC) capability information of a terminal sent by a core network (CN) network element, wherein the RAN network element is located in a second-standard network to which the terminal is handed over from a first-standard network using an inter-RAT handover, the first-standard network does not support an SRVCC function, and the second-standard network supports the SRVCC function;
    sending, by the RAN network element, a response message to the CN network element; and
    initiating, by the RAN network element, in response to switching a voice service of the terminal to a third-standard network, an SRVCC procedure according to the SRVCC capability information of the terminal, wherein the third-standard network does not support the SRVCC function.

6. The method according to claim 5, wherein receiving, by the RAN network element, SRVCC capability information of the terminal sent by the CN network element comprises:
    receiving, by the RAN network element, a user equipment context modification request message sent by the CN network element, wherein the user equipment context modification request message carries the SRVCC capability information.

7. The method according to claim 5, wherein the SRVCC capability information of the terminal comprises an SRVCC operation possible information element.

8. The method according to claim 5, wherein the third-standard network is different from the first-standard network.

9. The method according to claim 5, wherein the third-standard network and the first-standard network are a same network.

10. A method, comprising:
accessing, by a terminal, a second-standard network from a first-standard network using an inter-RAT handover, wherein the first-standard network does not support a single radio voice call continuity (SRVCC) function, and the second-standard network supports the SRVCC function;
sending, by the terminal, SRVCC capability information of the terminal to a core network (CN) network element in the second-standard network, causing the CN network element to send the SRVCC capability information of the terminal to a radio access network (RAN) network element in the second-standard network according to a SRVCC capability of the CN network element; and
switching a voice service of the terminal to a third-standard network, causing the RAN network element to initiate an SRVCC procedure according to the SRVCC capability information of the terminal, wherein the third-standard network does not support the SRVCC function.

11. The method according to claim 10, wherein the terminal sends the SRVCC capability information of the terminal to the CN network element in a tracking area update (TAU) procedure by using a TAU request message.

12. An apparatus, comprising:
a processor; and
a non-transitory computer readable storage medium, wherein the non-transitory computer readable storage medium stores a program, and when the program is executed by the processor, the following is performed:
obtaining single radio voice call continuity (SRVCC) capability information of a terminal from the terminal, wherein a core network (CN) network element is located in a second-standard network to which the terminal is handed over from a first-standard network using an inter-RAT handover, the first-standard network does not support an SRVCC function, and the second-standard network supports the SRVCC function; and
sending the SRVCC capability information to a radio access network (RAN) network element, wherein the RAN network element initiates an SRVCC procedure according to the SRVCC capability information of the terminal when switching a voice service of the terminal to a third-standard network, and wherein the third-standard network does not support the SRVCC function; and
wherein the apparatus is located in the CN network element.

13. The apparatus according to claim 12, wherein sending the SRVCC capability information to the RAN network element, comprises:
sending a user equipment context modification request message to the RAN network element, wherein the user equipment context modification request message carries the SRVCC capability information.

14. The apparatus according to claim 12, wherein obtaining the SRVCC capability information, comprises:
obtaining the SRVCC capability information of the terminal from a tracking area update (TAU) request message in a TAU procedure.

15. The apparatus according to claim 12, wherein the SRVCC capability information of the terminal comprises an SRVCC operation possible information element.

16. An apparatus, comprising:
a processor; and
a non-transitory computer readable storage medium, wherein the non-transitory computer readable storage medium stores a program, and when the program is executed by the processor, the following is performed:
receiving single radio voice call continuity (SRVCC) capability information of a terminal sent by a core network (CN) network element, wherein a radio access network (RAN) network element is located in a second-standard network to which the terminal is handed over from a first-standard network using an inter-RAT handover, the first-standard network does not support an SRVCC function, and the second-standard network supports the SRVCC function;
sending a response message to the CN network element; and
initiating, in response to switching a voice service of the terminal to a third-standard network, an SRVCC procedure according to the SRVCC capability information of the terminal, wherein the third-standard network does not support the SRVCC function; and
wherein the apparatus is located in the RAN network element.

17. The apparatus according to claim 16, wherein receiving the SRVCC capability information comprises:
receiving a user equipment context modification request message sent by the CN network element, wherein the user equipment context modification request message carries the SRVCC capability information.

18. The apparatus according to claim 16, wherein the SRVCC capability information of the terminal comprises an SRVCC operation possible information element.

19. The apparatus according to claim 16, wherein the third-standard network is different from the first-standard network.

20. The apparatus according to claim 16, wherein the third-standard network and the first-standard network are a same network.

21. An apparatus, located in a terminal and comprising:
a processor; and
a non-transitory computer readable storage medium, wherein the non-transitory computer readable storage medium stores a program, and when the program is executed by the processor, the following is performed:
accessing a second-standard network from a first-standard network using an inter-RAT handover, wherein the first-standard network does not support a single radio voice call continuity (SRVCC) function, and the second-standard network supports the SRVCC function;
sending SRVCC capability information of the terminal to a core network (CN) network element in the second-standard network, causing the CN network element to send the SRVCC capability information of the terminal to a radio access network (RAN) network element in the second-standard network according to an SRVCC capability of the CN network element; and switching a voice service of the terminal to a third-standard network, causing the RAN network element to initiate an SRVCC procedure according to the SRVCC capability information of the terminal, wherein the third-standard network does not support the SRVCC function.

22. The apparatus according to claim 21, wherein sending the SRVCC capability information comprises:
sending the SRVCC capability information of the terminal to the CN network element in a tracking area update (TAU) procedure using a TAU request message.

* * * * *